United States Patent
Iwamoto et al.

(10) Patent No.: US 10,449,964 B2
(45) Date of Patent: Oct. 22, 2019

(54) METHOD AND SYSTEM FOR CONTROLLING SAILING STOP IN VEHICLE

(71) Applicant: JATCO Ltd, Fuji-shi, Shizuoka (JP)

(72) Inventors: Tadashi Iwamoto, Kanagawa (JP); Akira Takano, Kanagawa (JP); Masayoshi Nakasaki, Isehara (JP); Yoshimasa Nishihiro, Zama (JP); Yukifumi Ootsuka, Isehara (JP)

(73) Assignee: JATCO LTD, Fuji-Shi (JP)

( * ) Notice: Subject to any disclaimer, the term of this patent is extended or adjusted under 35 U.S.C. 154(b) by 36 days.

(21) Appl. No.: 15/758,645

(22) PCT Filed: Oct. 17, 2016

(86) PCT No.: PCT/JP2016/080642
§ 371 (c)(1),
(2) Date: Mar. 8, 2018

(87) PCT Pub. No.: WO2017/069071
PCT Pub. Date: Apr. 27, 2017

(65) Prior Publication Data
US 2018/0244273 A1    Aug. 30, 2018

(30) Foreign Application Priority Data
Oct. 19, 2015    (JP) .................... 2015-205524

(51) Int. Cl.
*B60W 30/18*    (2012.01)
*B60W 30/182*    (2012.01)
(Continued)

(52) U.S. Cl.
CPC .......... *B60W 30/182* (2013.01); *B60W 10/02* (2013.01); *B60W 10/026* (2013.01);
(Continued)

(58) Field of Classification Search
CPC .............. B60W 10/06; B60W 10/026; B60W 10/10–115; B60W 30/18072; B60W 30/182; B60W 2030/1809
See application file for complete search history.

(56) References Cited

U.S. PATENT DOCUMENTS

| | | | |
|---|---|---|---|
| 2012/0135840 A1* | 5/2012 | Tatewaki | B60W 10/06 477/115 |
| 2012/0172175 A1 | 7/2012 | Nedorezov et al. | |
| 2016/0009292 A1 | 1/2016 | Yokokawa et al. | |

FOREIGN PATENT DOCUMENTS

| | | |
|---|---|---|
| JP | H07-266932 A | 10/1995 |
| JP | 2015-113911 A | 6/2015 |

(Continued)

OTHER PUBLICATIONS

Extended European Search Report dated Sep. 25, 2018 in European Application No. 16857386.3.

*Primary Examiner* — Erin D Bishop
(74) *Attorney, Agent, or Firm* — Foley & Lardner LLP

(57) ABSTRACT

Variator (20) and forward clutch (Fwd/C) disposed in series are provided between engine (1) having starter motor (15) and driving wheel (7). Sailing stop control that, on the basis of satisfaction of sailing entering condition, interrupts power transmission by frictional engagement element (Fwd/C), stops engine (1) and performs coast-travel is performed. When sailing entering condition is satisfied, coast-travel is started with rotation stop timing of variator (20) being delayed with respect to rotation stop timing of engine (1). When accelerator pedal depression operation intervenes after start of coast-travel, engine (1) is restarted by starter motor (15). When judged that input and output rotation speeds of frictional engagement element (Fwd/C) become synchronization rotation speed after restart of engine (1), frictional engagement element (Fwd/C) is reengaged. Shift (Continued)

response from coast-travel to normal travel is therefore improved at change-of-mind at which sailing quitting condition is satisfied during progress of automatic stop of engine.

2 Claims, 5 Drawing Sheets

(51) Int. Cl.
*B60W 10/115* (2012.01)
*B60W 10/02* (2006.01)
*B60W 10/04* (2006.01)
*B60W 10/06* (2006.01)
*F16H 61/02* (2006.01)
*F02D 17/00* (2006.01)
*F02D 29/00* (2006.01)
*F02D 29/02* (2006.01)
*F16D 48/02* (2006.01)

(52) U.S. Cl.
CPC ............ *B60W 10/04* (2013.01); *B60W 10/06* (2013.01); *B60W 10/115* (2013.01); *B60W 30/18072* (2013.01); *F02D 17/00* (2013.01); *F02D 29/00* (2013.01); *F02D 29/02* (2013.01); *F16D 48/02* (2013.01); *F16H 61/02* (2013.01); *B60W 2030/1809* (2013.01); *B60W 2030/18081* (2013.01); *B60W 2510/0241* (2013.01); *B60W 2510/18* (2013.01); *B60W 2540/10* (2013.01); *B60W 2540/12* (2013.01); *B60W 2710/021* (2013.01); *B60W 2710/024* (2013.01); *B60W 2710/06* (2013.01); *B60W 2710/0627* (2013.01); *Y02T 10/48* (2013.01); *Y02T 10/76* (2013.01)

(56) References Cited

FOREIGN PATENT DOCUMENTS

| JP | 2015-143050 A | 8/2015 |
| JP | 2016-020126 A | 2/2016 |

* cited by examiner

METHOD AND SYSTEM FOR CONTROLLING SAILING STOP IN VEHICLE

The present invention relates to a method and a system for controlling sailing stop of a vehicle that coast-travels with a power transmission from an engine to driving wheels being interrupted and the engine being stopped.

BACKGROUND ART

There has been known an automatic start and stop device for an engine of a vehicle that coast-travels with the engine automatically stopped and a start clutch being in a disconnected state during deceleration in which only a slight torque is required in a vehicle travel by a sailing stop control (for example, Patent Document 1).

In a related art device, however, when a sailing quitting condition (a sailing exit condition) is satisfied (hereinafter, described as "at a change-of-mind") by a re-depression operation of an accelerator pedal or a braking operation during the progress of an engine automatic stop, restart of the engine by a starter motor cannot be possible while an engine rotation speed having been reduced by the engine automatic stop is in a high rotation speed region. Because of this, the engine restart is carried out after waiting until the engine rotation speed is reduced to a rotation speed at which the engine restart by the starter motor can be possible. Therefore, there arises a problem of delaying a shift response from the coast-travel to a normal travel at the change-of-mind.

The present invention was made in view of the above technical problem. An object of the present invention is therefore to provide a sailing stop control method and a sailing stop control device for a vehicle which are capable of improving the shift response from the coast-travel to the normal travel at the change-of-mind at which the sailing quitting condition is satisfied during the progress of the engine automatic stop.

CITATION LIST

Patent Document

Patent Document 1: Japanese Unexamined Patent Application Publication No. JPH07-266932

SUMMARY OF THE INVENTION

In order to achieve the above object, a vehicle has a transmission and a frictional engagement element that are disposed in series between an engine and a driving wheel and a starter motor that starts the engine, and a sailing stop control that, on the basis of satisfaction of a sailing entering condition, interrupts power transmission by the frictional engagement element, stops the engine and performs coast-travel of the vehicle is performed. This sailing stop control is configured to, when the sailing entering condition is satisfied, start the coast-travel with a rotation stop timing of the transmission being delayed with respect to a rotation stop timing of the engine. Further, the sailing stop control is configured to, when a sailing quitting condition is satisfied after the coast-travel is started, restart the engine by the starter motor. Further, the sailing stop control is configured to, when it is judged that input and output rotation speeds of the frictional engagement element become a synchronization rotation speed after the engine is restarted, reengage the frictional engagement element.

Accordingly, therefore, when the sailing entering condition is satisfied, the coast-travel is started with the rotation stop timing of the transmission being delayed with respect to the rotation stop timing of the engine. And, when the sailing quitting condition is satisfied after the coast-travel is started, the engine is restarted by the starter motor. Then, when it is judged that input and output rotation speeds of the frictional engagement element become the synchronization rotation speed after the engine is restarted, the frictional engagement element is reengaged. That is, at the change-of-mind at which a re-depression operation of an accelerator pedal or a brake operation intervene during the progress of the engine automatic stop, on the basis of the sailing quitting condition, the engine is restarted, and the frictional engagement element is reengaged. Since the transmission rotation speed is higher than the engine rotation speed at this change-of-mind, a load imposed on or applied to the engine when increasing the engine rotation speed becomes small. With this, an increase speed of the engine rotation speed increases (the increase speed of the engine rotation speed becomes fast). Therefore, the input and output rotation speeds of the frictional engagement element become a synchronization judgment rotation speed early at the reengagement of the frictional engagement element, then the reengagement of the frictional engagement element is completed. As a consequence, the shift response from the coast-travel to the normal travel can be improved at the change-of-mind at which the sailing quitting condition is satisfied during the progress of the automatic stop of the engine.

EMBODIMENTS FOR CARRYING OUT THE INVENTION

Figure 1:
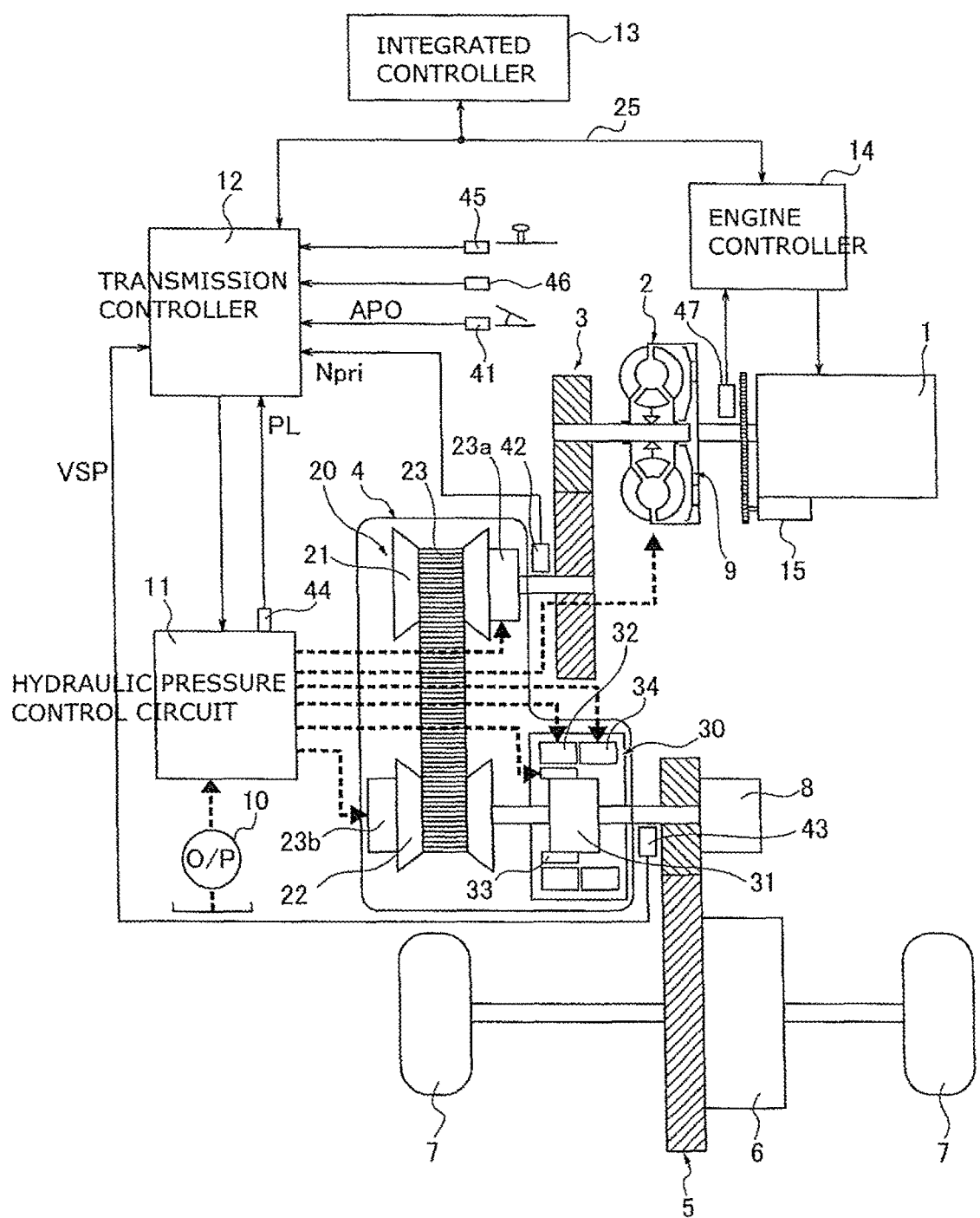
FIG. 1 is a general system diagram of an engine vehicle having a continuously variable transmission with an auxiliary transmission to which a sailing stop control method and a sailing stop control device according to an embodiment 1 are applied.

In the following description, a best mode for realizing a sailing stop control method and a sailing stop control device for a vehicle according to the present invention will be explained on the basis of an embodiment 1 shown in the drawings.

Embodiment 1

First, a configuration will be explained. The sailing stop control method and the sailing stop control device for the vehicle of the embodiment 1 is a sailing stop control method and a sailing stop control device of the vehicle which are applied to an engine vehicle in which a continuously variable transmission having an auxiliary transmission is mounted. A configuration of the sailing stop control device for the engine vehicle of the embodiment 1 will be separately explained by [General system configuration], [Shift control configuration by shift map] and [Sailing stop control process configuration].

[General System Configuration]

Figure 2:
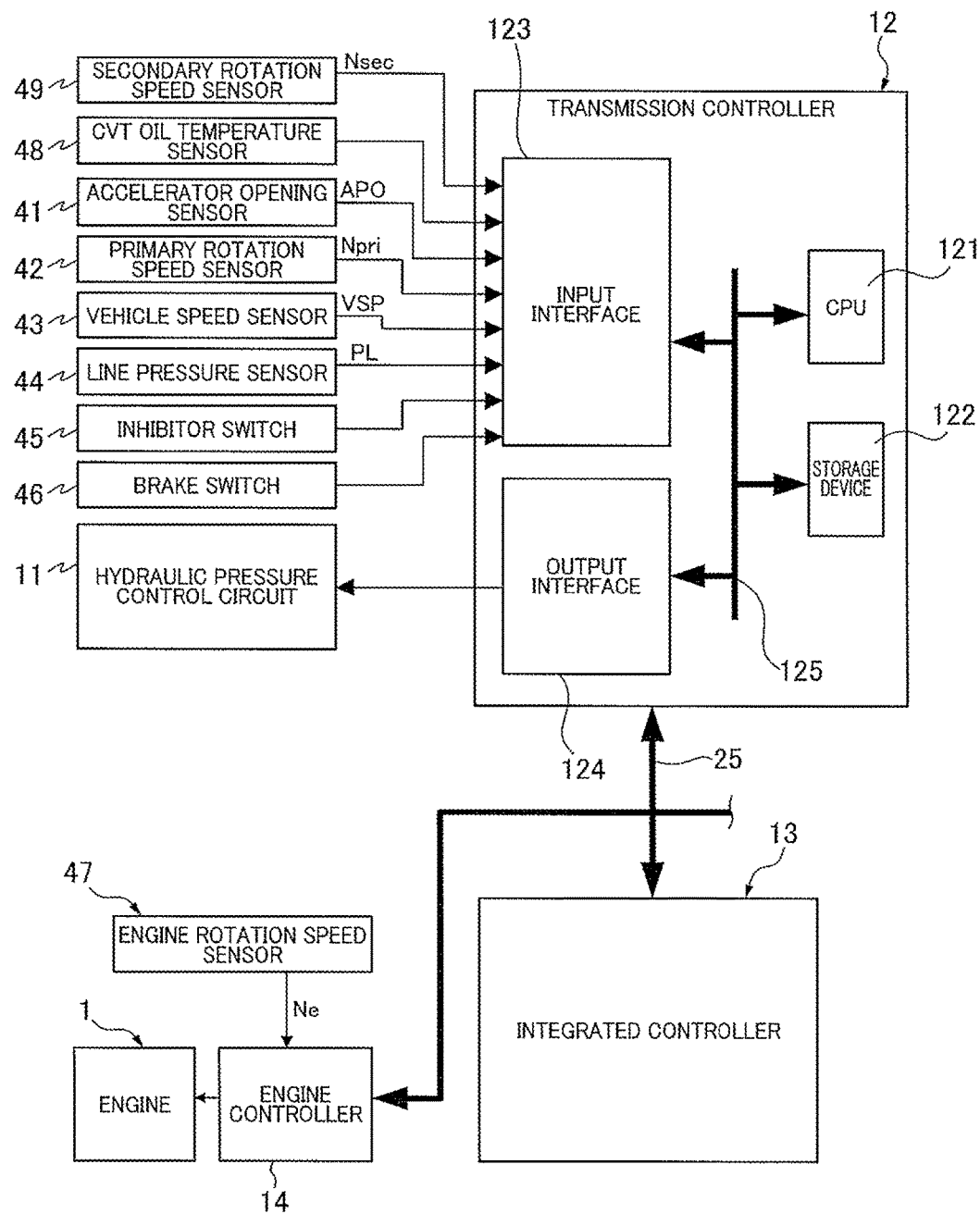
FIG. 2 is a block diagram of a control system configuration of the continuously variable transmission with the auxiliary transmission to which the sailing stop control method and the sailing stop control device according to the embodiment 1 are applied.

FIG. 1 shows a general system diagram of the engine vehicle having the continuously variable transmission with the auxiliary transmission to which the sailing stop control device according to the embodiment 1 is applied. FIG. 2 shows a control system configuration. The general system configuration will be explained below with reference to FIGS. 1 and 2. Here, in the following explanation, "transmission ratio" of a certain transmission mechanism is a value obtained by dividing an input rotation speed by an output rotation speed of the transmission mechanism. Further, a "Lowest transmission ratio" means a maximum transmission ratio of the transmission mechanism, while a "Highest transmission ratio" means a minimum transmission ratio of the transmission mechanism.

The engine vehicle shown in FIG. 1 has, as a travel driving source, an engine 1 having a starter motor 15 for engine start. Output rotation of the engine 1 is transmitted to a driving wheel 7 through a torque converter 2 equipped with a lock-up clutch 9, a reduction gear pair 3, a continuously variable transmission 4 (hereinafter, called an "automatic transmission 4") having an auxiliary transmission, a final gear pair 5 and a final speed reduction device 6. The final gear pair 5 is provided with a parking mechanism 8 that mechanically locks an output shaft of the automatic transmission 4 so that the output shaft of the automatic transmission 4 cannot rotate upon parking. As a hydraulic pressure source, a mechanical oil pump 10 that is driven by power of the engine 1 is provided. Further, a hydraulic pressure control circuit 11 that controls a discharge pressure from the mechanical oil pump 10 and provides it to each part of the automatic transmission 4, a transmission controller 12 that controls the hydraulic pressure control circuit 11, an integrated controller 13 and an engine controller 14 are provided. Each configuration will be explained below.

The automatic transmission 4 has a belt-type continuously variable transmission mechanism (hereinafter, called a "variator 20") and an auxiliary transmission mechanism 30 provided in series with the variator 20. Here, "provided in series with" means that the variator 20 and the auxiliary transmission mechanism 30 are arranged in series on a power transmission path. The auxiliary transmission mechanism 30 is directly connected to an output shaft of the variator 20 as shown in this embodiment, or could be connected to the variator 20 through another transmission mechanism or another power transmission mechanism (for instance, a gear train).

The variator 20 is a belt-type continuously variable transmission mechanism having a primary pulley 21, a secondary pulley 22 and a V-belt 23 wound around these pulleys 21 and 22 and rotating around these pulleys 21 and 22. Each of the primary pulley 21 and the secondary pulley 22 has a stationary conical plate (a stationary sheave) and a movable conical plate (a movable sheave) that is set with both sheave surfaces of the stationary and movable conical plates facing to each other so as to form a V-shaped groove between the stationary and movable conical plates. Further, the primary pulley 21 and the secondary pulley 22 respectively have a primary hydraulic cylinder 23a and a secondary hydraulic cylinder 23b each of which is provided on a back surface of the movable conical plate and moves the movable conical plate in an axial direction of the movable conical plate. When controlling a hydraulic pressure provided to the primary hydraulic cylinder 23a and the secondary hydraulic cylinder 23b, each width of the V-shaped groove varies, and each contact radius between the V-belt 23 and each of the pulleys 21 and 22 varies, then a transmission ratio of the variator 20 continuously varies.

The auxiliary transmission mechanism 30 is a transmission mechanism of forward 2 speeds and reverse 1 speed. The auxiliary transmission mechanism 30 has a ravigneaux planetary gear mechanism 31 in which carriers of two planetary gears are connected and a plurality of frictional engagement elements 32 to 34 (a Low brake 32, a High clutch 33 and a Reverse brake (Rev brake) 34) which are engaged with a plurality of rotational elements that form the ravigneaux planetary gear mechanism 31 and which change their engagement states.

A speed (a speed stage or a shift stage) of the auxiliary transmission mechanism 30 is changed by controlling a supply pressure to each of the frictional engagement elements 32 to 34 and changing an engaging/disengaging state of each of the frictional engagement elements 32 to 34. For instance, when the Low brake 32 is engaged and the High clutch 33 and the Rev brake 34 are each disengaged, the speed of the auxiliary transmission mechanism 30 is a forward 1st speed (hereinafter, called a "low speed mode"). When the High clutch 33 is engaged and the Low brake 32 and the Rev brake 34 are each disengaged, the speed of the auxiliary transmission mechanism 30 is a forward 2nd speed (hereinafter, called a "high speed mode") whose transmission ratio is smaller than that of the 1st speed. Further, when the Rev brake 34 is engaged and the Low brake 32 and the High clutch 33 are each disengaged, the speed of the auxiliary transmission mechanism 30 is a reverse speed. Here, when the Low brake 32, the High clutch 33 and the Rev brake 34 are each disengaged, a driving force transmission path to the driving wheel 7 is interrupted. The Low brake 32 and the High clutch 33 are hereinafter called a "forward clutch Fwd/C".

As shown in FIG. 2, the transmission controller 12 is formed from a CPU 121, a storage device 122 having RAM and ROM, an input interface 123, an output interface 124 and a bus 125 connecting these components to each other. This transmission controller 12 realizes a desired speed by controlling the transmission ratio of the variator 20 and performing a changeover of the plurality of frictional engagement elements (the Low brake 32, the High clutch 33 and the Rev brake 34) of the auxiliary transmission mechanism 30.

The input interface 123 inputs an output signal of an accelerator opening degree sensor 41 that detects a depression degree of an accelerator pedal (hereinafter, called, an "accelerator opening APO"), an output signal of a primary rotation speed sensor 42 that detects an input rotation speed of the variator 20 (=a rotation speed of the primary pulley 21, hereinafter, called a "primary rotation speed Npri"), an output signal of a vehicle speed sensor 43 that detects a travelling speed of the vehicle (hereinafter, called a "vehicle speed VSP"), an output signal of a line pressure sensor 44 that detects a line pressure of the automatic transmission 4 (hereinafter, called a "line pressure PL"), an output signal of an inhibitor switch 45 that detects a position of a selection lever, an output signal of a brake switch 46 that detects a brake state, and so on. Further, the input interface 123 inputs an output signal of a CVT oil temperature sensor 48 that detects a CVT oil temperature and an output signal of a secondary rotation speed sensor 49 that detects an output rotation speed of the variator 20 (=a rotation speed of the secondary pulley 22, hereinafter, called a "secondary rotation speed Nsec").

The storage device 122 stores therein a shift control program of the automatic transmission 4 and a shift map (FIG. 3) used for this shift control program. The CPU 121 reads the shift control program stored in the storage device 122 and executes it. Also, the CPU 121 generates a shift control signal by performing computation for each signal inputted through the input interface 123, and outputs the shift control signal to the hydraulic pressure control circuit 11 through the output interface 124. Each value used for the computation by the CPU 121 and its computation result are stored in the storage device 122 as appropriate.

The hydraulic pressure control circuit 11 is formed by a plurality of flow passages and a plurality of hydraulic pressure control valves. The hydraulic pressure control circuit 11 switches a hydraulic pressure supply path (a hydraulic pressure supply line) by controlling the plurality of hydraulic pressure control valves on the basis of the shift control signal from the transmission controller 12. A detailed explanation will be made later.

The integrated controller 13 performs an integrated control of a plurality of vehicle-mounted controllers so as to secure a proper transmission control by the transmission controller 12 and a proper engine control by the engine controller 14. This integrated controller 13 is connected to the vehicle-mounted controllers such as the transmission controller 12 and the engine controller 14 through a CAN communication line 25 so as to be able to exchange information between them. Further, the integrated controller 13 performs a sailing stop control that stops the engine 1 during the coast-travel, and so on.

The engine controller 14 performs an engine stop control by fuel cut of the engine 1, an engine start control that starts the engine 1 using the starter motor 15, and so on. The engine controller 14 inputs an output signal of an engine rotation speed sensor 47 that detects a rotation speed of the engine 1 (hereinafter, called an "engine rotation speed Ne"), and so on.

[Shift Control Configuration by Shift Map]

Figure 3:
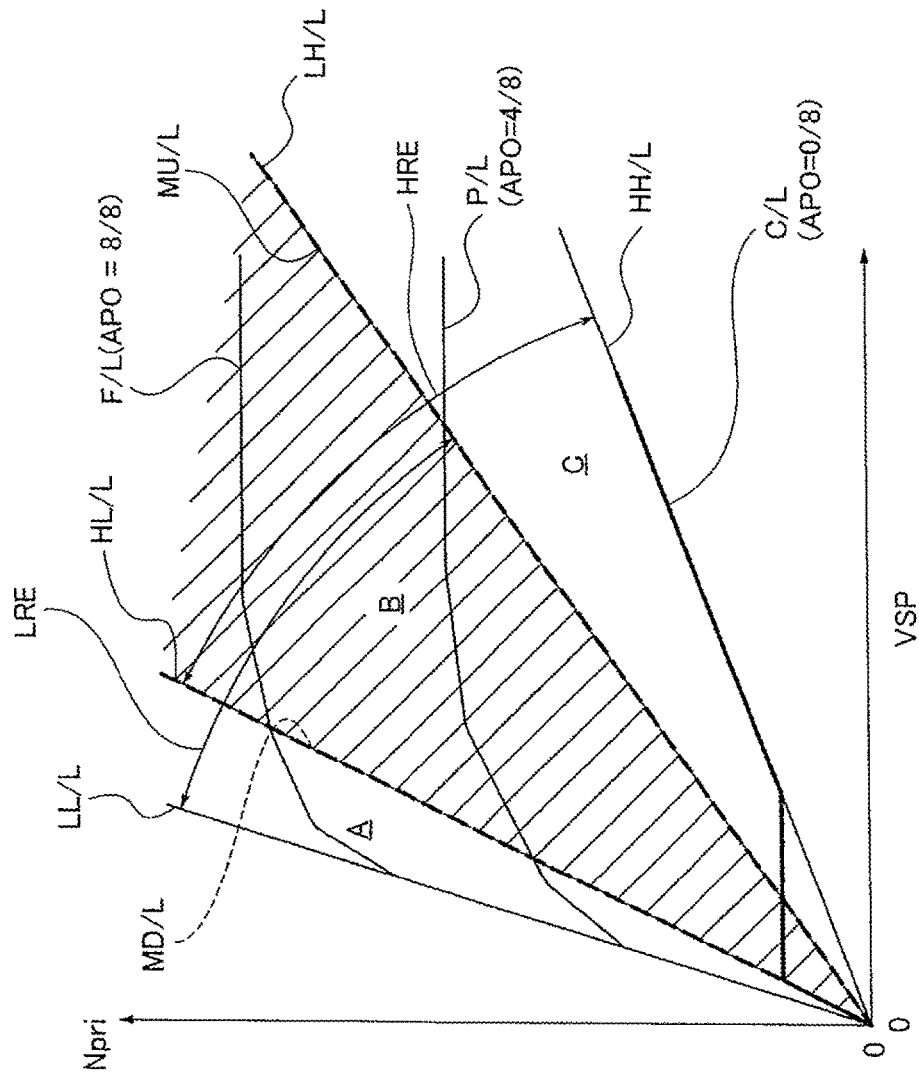
FIG. 3 is a shift map showing an example of a shift map stored in a storage device of a transmission controller of the embodiment 1.

FIG. 3 is a shift map showing an example of a shift map stored in the storage device 122 of the transmission controller 12. A shift control configuration by the shift map will be explained below with reference to FIG. 3.

An operating point of the automatic transmission 4 is determined on the basis of the vehicle speed VSP and the primary rotation speed Npri on the shift map shown in FIG. 3. A gradient of a line connecting the operating point of the automatic transmission 4 and a zero point at a lower left corner of the shift map indicates the transmission ratio (a total transmission ratio obtained by multiplying a transmission ratio vRatio of the variator 20 by a transmission ratio subRatio of the auxiliary transmission mechanism 30, hereinafter, called a "through transmission ratio Ratio") of the automatic transmission 4. In this shift map, a shift line is set for each accelerator opening APO, in the same manner as a conventional shift map of a belt type continuously variable transmission. The shift of the automatic transmission 4 is carried out in accordance with the shift line that is selected according to the accelerator opening APO. Here, in FIG. 3, to simplify the shift map, only a full load line F/L (a shift line of the accelerator opening APO=8/8), a partial line P/L (a shift line of the accelerator opening APO=4/8) and a coast line C/L (a shift line of the accelerator opening APO=0) are illustrated.

When the automatic transmission 4 is in the low speed mode, the shift of the automatic transmission 4 can be varied between a low speed mode Lowest line LL/L obtained by setting the transmission ratio vRatio of the variator 20 to the maximum and a low speed mode Highest line LH/L obtained by setting the transmission ratio vRatio of the variator 20 to the minimum. At this time, the operating point of the automatic transmission 4 moves in an A region and a B region. On the other hand, when the automatic transmission 4 is in the high speed mode, the shift of the automatic transmission 4 can be varied between a high speed mode Lowest line HL/L obtained by setting the transmission ratio vRatio of the variator 20 to the maximum and a high speed mode Highest line HH/L obtained by setting the transmission ratio vRatio of the variator 20 to the minimum. At this time, the operating point of the automatic transmission 4 moves in the B region and a C region.

The transmission ratio of each speed (each speed stage or each shift stage) of the auxiliary transmission mechanism 30 is set so that a transmission ratio (a low speed mode Highest transmission ratio) corresponding to the low speed mode Highest line LH/L is smaller than a transmission ratio (a high speed mode Lowest transmission ratio) corresponding to the high speed mode Lowest line HL/L. With this setting, a low speed mode ratio range LRE that is a range of the through transmission ratio Ratio, which can be taken in the low speed mode, of the automatic transmission 4 and a high speed mode ratio range HRE that is a range of the through transmission ratio Ratio, which can be taken in the high speed mode, of the automatic transmission 4 partly overlap with each other. When the operating point of the automatic transmission 4 is positioned in the B region (an overlap region) defined between the high speed mode Lowest line HL/L and the low speed mode Highest line LH/L, as the mode of the automatic transmission 4, either of the low speed mode and the high speed mode can be selected.

The transmission controller 12 reads this shift map and sets the through transmission ratio Ratio corresponding to the vehicle speed VSP and the accelerator opening APO (the operating point of the vehicle) as an attainment through transmission ratio DRatio. This attainment through transmission ratio DRatio is a target value which the through transmission ratio Ratio should finally attain or reach in this operating condition. The transmission controller 12 sets a target through transmission ratio tRatio that is a transient target value in order for the through transmission ratio Ratio to follow the attainment through transmission ratio DRatio with a predetermined response characteristic, and controls the variator 20 and the auxiliary transmission mechanism 30 so that the through transmission ratio Ratio is fitted to or identical with the target through transmission ratio tRatio.

On the shift map, a mode change up-shift line MU/L (a 1→2 up-shift line of the auxiliary transmission mechanism 30) by which an up-shift of the auxiliary transmission mechanism 30 is performed is set on the low speed mode Highest line LH/L so as to substantially overlap with the low speed mode Highest line LH/L. The through transmission ratio Ratio corresponding to the mode change up-shift line MU/L is substantially identical with the low speed mode Highest line LH/L (the low speed mode Highest transmission ratio). Further, on the shift map, a mode change down-shift line MD/L (a 2→1 down-shift line of the auxiliary transmission mechanism 30) by which a down-shift of the auxiliary transmission mechanism 30 is performed is set on the high speed mode Lowest line HL/L so as to substantially overlap with the high speed mode Lowest line HL/. The through transmission ratio Ratio corresponding to the mode change down-shift line MD/L is substantially identical with the high speed mode Lowest line HL/L (the high speed mode Lowest transmission ratio).

Then, in a case where the operating point of the automatic transmission 4 crosses the mode change up-shift line MU/L or the mode change down-shift line MD/L, i.e. in a case where the target through transmission ratio tRatio of the automatic transmission 4 changes by crossing a mode change transmission ratio mRatio or is identical with the mode change transmission ratio mRatio, the transmission controller 12 performs a mode change shift control. In this mode change shift control, the transmission controller 12 performs a "cooperative control" that coordinates the two transmission ratios of the variator 20 and the auxiliary transmission mechanism 30 such that the transmission ratio vRatio of the variator 20 is changed in a direction opposite to a direction of change of the transmission ratio subRatio of the auxiliary transmission mechanism 30 while performing the shift of the auxiliary transmission mechanism 30.

In the "cooperative control", when the target through transmission ratio tRatio of the automatic transmission 4 crosses the mode change up-shift line MU/L from the B region side toward the C region side, or when the target through transmission ratio tRatio of the automatic transmission 4 is identical with the mode change up-shift line MU/L from the B region side, the transmission controller 12 makes a 1→2 up-shift judgment, and changes the speed (the speed stage or the shift stage) of the auxiliary transmission mechanism 30 from the 1st speed to the 2nd speed, and also changes the transmission ratio vRatio of the variator 20 from the Highest transmission ratio to a Low transmission ratio. On the other hand, when the target through transmission ratio tRatio of the automatic transmission 4 crosses the mode change down-shift line MD/L from the B region side toward the A region side, or when the target through transmission ratio tRatio of the automatic transmission 4 is identical with the mode change down-shift line MD/L from the B region side, the transmission controller 12 makes a 2→1 down-shift judgment, and changes the speed (the speed stage or the shift stage) of the auxiliary transmission mechanism 30 from the 2nd speed to the 1st speed, and also changes the transmission ratio vRatio of the variator 20 from the Lowest transmission ratio to a High transmission ratio side.

The reason why the "cooperative control" that changes the transmission ratio vRatio of the variator 20 at the mode change up-shift and the mode change down-shift is performed is because driver's odd feeling (or driver's awkward feeling) due to a change of an input rotation speed which is caused by a step of the through transmission ratio Ratio of the automatic transmission 4 can be suppressed, and because a shift shock of the auxiliary transmission mechanism 30 can be lessened.

[Sailing Stop Control Process Configuration]

Figure 4:
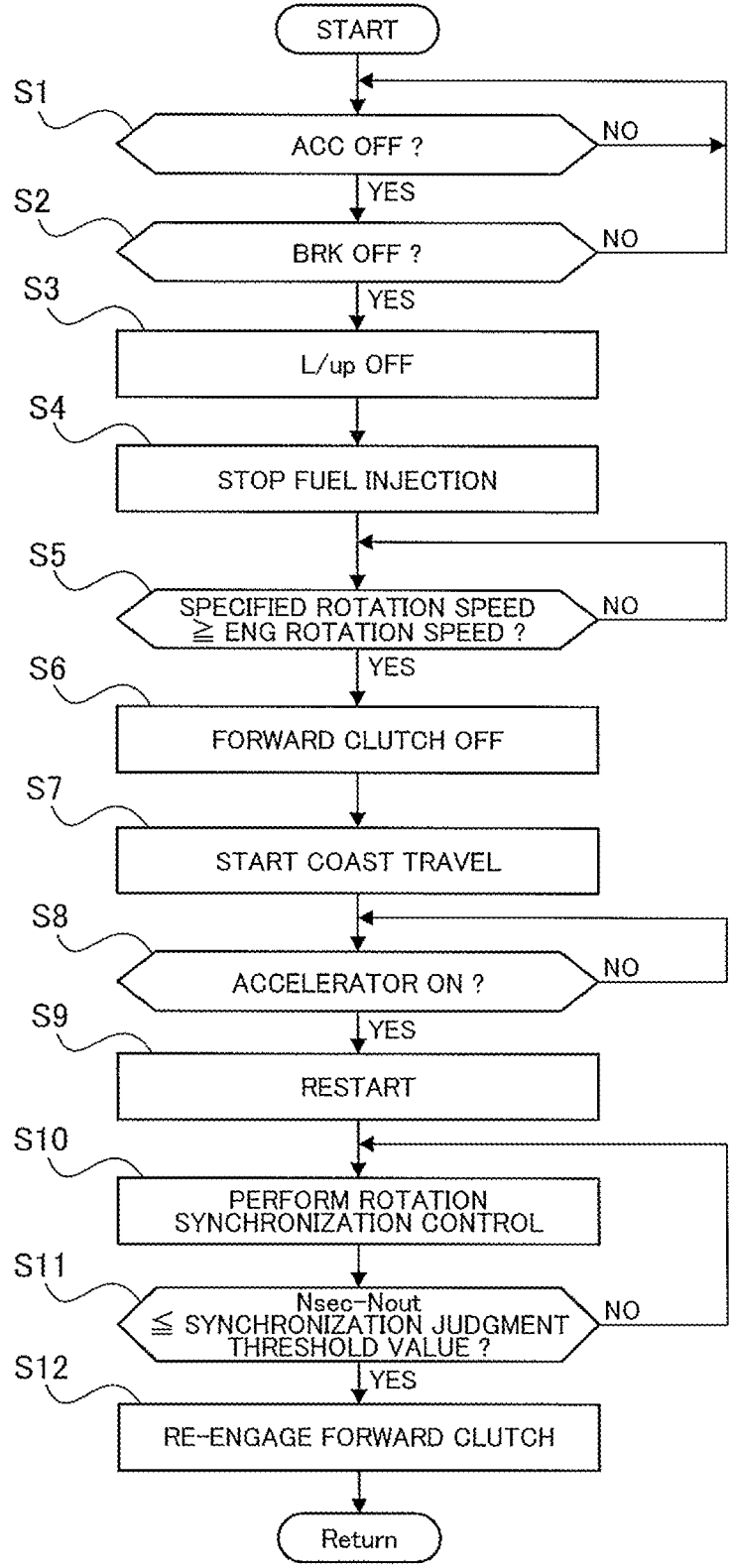
FIG. 4 is a flow chart showing flows of a sailing stop control process executed by an integrated controller of the embodiment 1.

FIG. 4 shows flows of a sailing stop control process (a sailing stop control section) executed by the integrated controller 13 of the embodiment 1. Each step of the sailing stop control process in FIG. 4 will be explained below.

At step S1, a judgment is made as to whether or not an accelerator OFF condition, which is one of sailing entering conditions, is satisfied during vehicle travel with the engine 1 being the travel driving source and the forward clutch Fwd/C (the Low brake 32 or the High clutch 33) engaged.

If YES (the accelerator OFF condition is satisfied), the routine proceeds to step S2. If NO (the accelerator OFF condition is not satisfied), the judgment at step S1 is repeated.

At step S2, subsequently to the judgment of "the accelerator OFF condition is satisfied" at step S1, a judgment is made as to whether or not a brake OFF condition, which is the other of the sailing entering conditions, is satisfied. If YES (the brake OFF condition is satisfied), the routine proceeds to step S3. If NO (the brake OFF condition is not satisfied), the routine is returned to step S1.

Here, the "sailing entering conditions" are the followings.
  (a) during forward travel by an engine drive (the vehicle is travelling forward by the engine drive) (it is judged by a range position signal or a vehicle speed signal, and so on)
  (b) accelerator OFF (it is judged by an idle switch signal)
  (c) brake OFF (it is judged by a brake switch signal)

If a state in which the conditions of (a) to (c) are all satisfied continues for a predetermined time (a delay time: e.g. 1 to 2 sec), it is judged that the sailing entering conditions are satisfied. That is, the sailing entering conditions are set to conditions that detect coast-travel without driver's intention to accelerate and stop the vehicle.

At step S3, subsequently to the judgment of "the brake OFF condition is satisfied" at step S2, a lock-up release command that releases or disengages the lock-up clutch 9 having been engaged is outputted, and the routine proceeds to step S4. Here, the reason why the lock-up clutch 9 is released is because the engine 1 and the automatic transmission 4, which are in a drive connecting state, are disconnected from each other and individual controllability of the engine 1 and the automatic transmission 4 is secured.

At step S4, subsequently to the release of the lock-up clutch 9 at step S3, after completion of the release of the lock-up clutch 9, fuel injection to the engine 1 is stopped (fuel cut), and the routine proceeds to step S5. Here, the completion of the release of the lock-up clutch 9 is judged when a rotation difference between the engine rotation speed Ne (an input rotation speed) and the primary rotation speed Npri (an output rotation speed) becomes a predetermined rotation speed or more.

At step S5, subsequently to the stop of the fuel injection at step S4, a judgment is made as to whether or not the rotation speed of the engine 1, which has been reduced by the release of the lock-up clutch 9 and the disconnection from the variator 20, is reduced to a specified rotation speed or less. If YES (the engine rotation speed≤the specified rotation speed), the routine proceeds to step S6. If NO (the engine rotation speed>the specified rotation speed), the judgment at step S5 is repeated. Here, the "specified rotation speed" is a rotation speed for determining a release timing of the forward clutch Fwd/C (the Low brake 32 or the High clutch 33), i.e. reduction in the rotation speed of the variator 20 by disconnecting the variator 20 from the driving wheel 7. For instance, the specified rotation speed is set to about a 500 rpm. With this setting of the specified rotation speed, a rotation stop timing of the variator 20 is delayed with respect to a rotation stop timing of the engine 1.

At step S6, subsequently to the judgment of the engine rotation speed≤the specified rotation speed at step S5, the forward clutch Fwd/C (the Low brake 32 or the High clutch 33), which has been maintained in an engaged state after the sailing entering conditions are satisfied, is released or disengaged, and the routine proceeds to step S7.

At step S7, subsequently to the release of the forward clutch Fwd/C at step S6, the coast-travel by the sailing stop control with the fuel injection to the engine 1 being in the stop state and the forward clutch Fwd/C released is started, and the routine proceeds to step S8.

At step S8, subsequently to the start of the coast-travel at step S7 or a judgment of accelerator OFF at step S8, a judgment is made as to whether or not an accelerator pedal depression operation condition (an accelerator ON condition), which is one of sailing quitting conditions (or sailing exit conditions), is satisfied after the start of the coast-travel. If YES (the accelerator ON), the routine proceeds to step S9. If NO (the accelerator OFF), the judgment at step S8 is repeated. Here, the "sailing quitting condition" is accelerator ON that is a quitting condition by acceleration request, or brake ON that is a quitting condition by deceleration request, or a vehicle speed condition, or an air conditioner condition, or a power source condition, and so on.

At step S9, subsequently to the judgment of the accelerator ON at step S8, a restart control of the engine 1 by the starter motor 15 is started, and the routine proceeds to step S10.

At step S10, subsequently to the engine restart at step S9, a rotation synchronization control of input and output rotation speeds of the forward clutch Fwd/C which has been released at step S6 is performed, and the routine proceeds to step S11. Here, the rotation synchronization control is a control that synchronizes the input rotation speed (the secondary rotation speed Nsec of the variator 20) and the output rotation speed (an output rotation speed Nout of the automatic transmission 4) of the forward clutch Fwd/C. Information of the secondary rotation speed Nsec of the variator 20 is obtained by the secondary rotation speed sensor 49, and information of the output rotation speed Nout of the automatic transmission 4 is obtained by the vehicle speed sensor 43. In the rotation synchronization control, a control that increases the rotation speed of the engine 1 that is restarted is carried out. And, by increasing the secondary rotation speed Nsec by the increase of the engine rotation speed, the secondary rotation speed Nsec is brought closer to the output rotation speed Nout.

At step S11, subsequently to the performing of the rotation synchronization control at step S10, a judgment is made as to whether or not a difference between the secondary rotation speed Nsec of the variator 20 and the output rotation speed Nout of the automatic transmission 4 is a synchronization judgment threshold value or less. If YES (Nsec−Nout≤the synchronization judgment threshold value), the routine proceeds to step S12. If NO (Nsec−Nout>the synchronization judgment threshold value), the routine is returned to step S10. Here, the "synchronization judgment threshold value" is set to a rotation speed difference by which an engagement shock of the forward clutch Fwd/C can be suppressed.

At step S12, subsequently to the judgment of "Nsec−Nout≤the synchronization judgment threshold value" at step S11, the forward clutch Fwd/C (the Low brake 32 or the High clutch 33) having been in a released state (a disengaged state) is reengaged, and the routine proceeds to Return.

Next, operation or working will be explained. Operation or working of the sailing stop control device of the engine vehicle according to the embodiment 1 will be separately explained by [Sailing stop control process], [Operation of sailing stop control] and [Feature of sailing stop control method].

[Sailing Stop Control Process]

Sailing stop control process of the embodiment 1 will be explained on the basis of the flowchart shown in FIG. 4. First, when the sailing entering condition is satisfied during the vehicle travel with the engine 1 being the travel driving source and the forward clutch Fwd/C engaged, in the flow chart in FIG. 4, the routine proceeds to step S1→step S2→step S3→step S4→step S5. At step S3, subsequently to the judgment of the sailing entering conditions at steps S1 and S2, the lock-up release command that releases or disengages the lock-up clutch 9 having been engaged is outputted. At next step S4, after completion of the release of the lock-up clutch 9, fuel injection to the engine 1 is stopped. At step S5, the judgment is made as to whether or not the rotation speed of the engine 1, which has been reduced by the release of the lock-up clutch 9 and the disconnection from the variator 20, is reduced to the specified rotation speed or less.

If it is judged that the engine rotation speed is reduced to the specified rotation speed or less, the routine proceeds to step S6→step S7→step S8 from step S5. At step S6, the forward clutch Fwd/C (the Low brake 32 or the High clutch 33), which has been maintained in the engaged state after the sailing entering conditions are satisfied, is released or disengaged. At step S7, the coast-travel by the sailing stop control with the fuel injection to the engine 1 being in the stop state and the forward clutch Fwd/C released is started. Then, if the sailing quitting conditions (the accelerator ON or the brake ON) are not satisfied after the start of the coast-travel at step S7, the coast-travel by the sailing stop control is maintained.

On the other hand, if the accelerator pedal depression operation condition (the accelerator ON condition), which is one of the sailing quitting conditions, is satisfied immediately after the start of the coast-travel at step S7, the routine proceeds to step S9→step S10→step S11 from step S8. At step S9, the restart control of the engine 1 by the starter motor 15 is started. At step S10, the rotation synchronization control of the input and output rotation speeds of the forward clutch Fwd/C which has been released at step S6 is performed as long as the rotation synchronization judgment at step S11 is not satisfied. Then, if it is judged that the rotation synchronization judgment is satisfied at step S11, the routine proceeds to step S12 from step S11. At step S12, the forward clutch Fwd/C (the Low brake 32 or the High clutch 33) having been in the released state (the disengaged state) is reengaged.

As explained above, the control is configured to, when the sailing entering condition is satisfied, start the coast-travel with the rotation stop timing of the variator 20 being delayed with respect to the rotation stop timing of the engine 1. Then, subsequently to the start of the coast-travel, in a case where the accelerator pedal depression operation intervenes immediately after the start of the coast-travel, an engine rotation speed increase time after the engine restart can be shortened, and a response time of the reengagement of the forward clutch Fwd/C can be shortened. Here, also in a case where the accelerator pedal depression operation is carried out after a long time elapses after the start of the coast-travel, by performing the same control operation, a shift from the coast-travel to a normal travel can be possible.

[Operation of Sailing Stop Control]

The aim of the sailing stop control is to extend a free running distance at an accelerator pedal non-depression operation (an accelerator pedal release operation) then to enhance fuel economy by releasing or disengaging the forward clutch Fwd/C that transmits power of a CVT (a power transmission mechanism) from the engine 1 at the accelerator pedal non-depression operation (the accelerator pedal release operation) and disconnecting the engine 1 from the driving wheel 7 then preventing deceleration due to an engine brake, regardless of a vehicle speed region during the travel. Also, the aim of the sailing stop control is to save fuel for maintaining idling by stopping the engine 1.

However, when a shift response from the coast-travel to the normal travel is delayed at a change-of-mind at which a re-depression operation of the accelerator pedal intervenes during the progress of an engine automatic stop, the driver is subjected to odd feeling or awkward feeling.

An operation of the sailing stop control according to the embodiment 1 which achieves the above aim of the sailing stop control and improves the shift response from the coast-travel to the normal travel at the change-of-mind will be explained on the basis of a time chart shown in FIG. 5 as compared with a comparative example. Here, in FIG. 5, time t1 is a time when the condition of the accelerator OFF/the brake OFF is satisfied. Time t2 is a time when the sailing entering conditions are satisfied. Time t3 is a time when the fuel cut is started. Time t4 is a time when the release of the forward clutch Fwd/C starts. Time t5 is a time of the accelerator ON/start of the engine restart. Time t6 is a time of start of the reengagement of the forward clutch Fwd/C. Time t7 is a time of start of reengagement of the lock-up clutch 9. Time t8 is a time of start of reengagement of a forward clutch of the comparative example. Time t9 is a time of start of reengagement of a lock-up clutch of the comparative example. Further, to simplify the explanation, the transmission ratio of the variator 20 is 1 (Npri≈Nsec).

Figure 5:
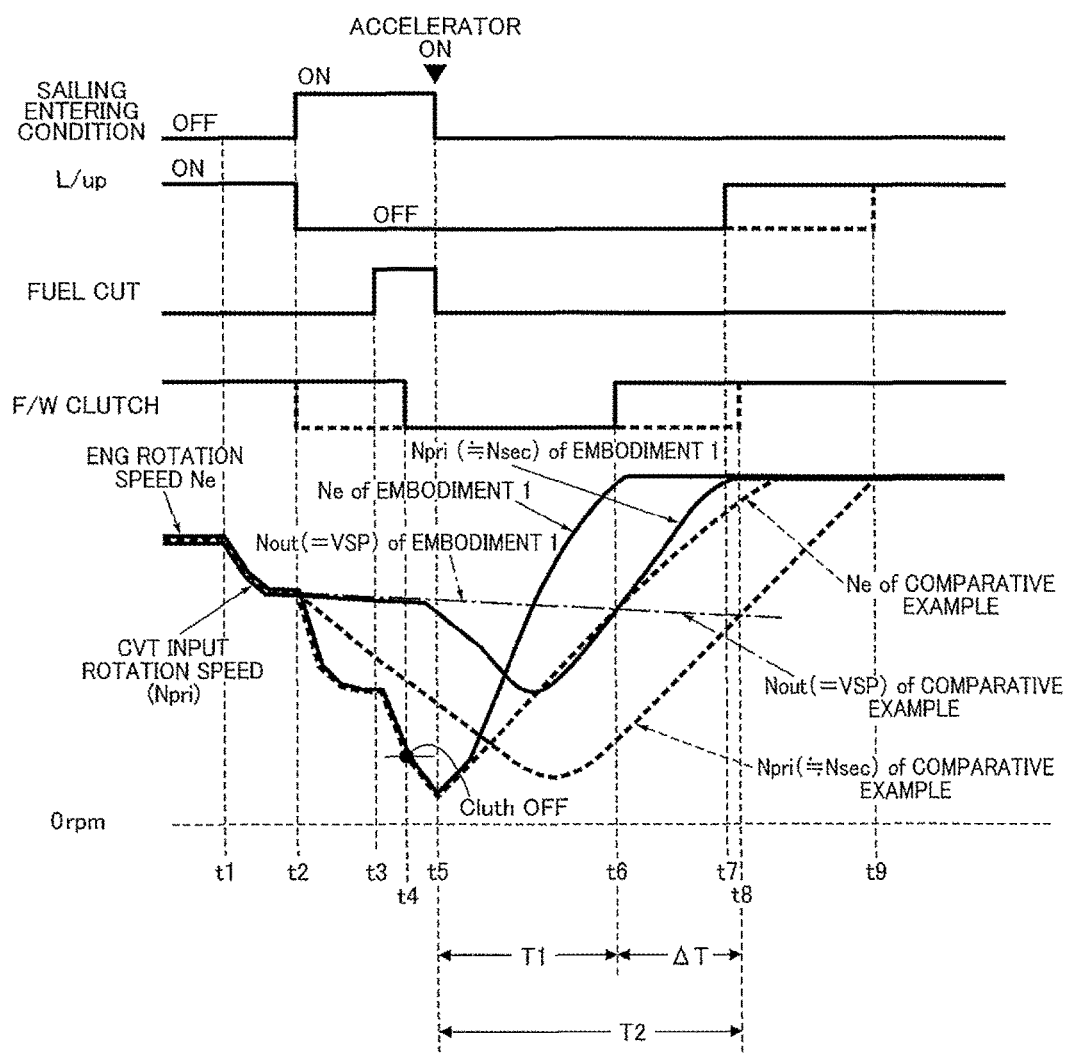
FIG. 5 is a time chart showing each characteristic of a sailing entering condition, a lock-up clutch (L/UP), fuel cut, a forward clutch (F/W clutch), an engine rotation speed, a CVT input rotation speed (Npri) and a vehicle speed VSP in a travel scene by a change-of-mind at which a re-depression operation of an accelerator pedal intervenes during the progress of an engine automatic stop.

In the case of the comparative example, as shown by characteristics of broken lines in FIG. 5, at time t2 when the sailing entering conditions are satisfied, release of the lock-up clutch 9 and release of the forward clutch Fwd/C are started simultaneously. At time t3 when the release of the lock-up clutch 9 is completed, the fuel cut is started. That is, in the comparative example, the variator 20 is connected to the engine 1 at an upstream side through the torque converter 2, and is disconnected from the driving wheel 7 at a downstream side by the forward clutch Fwd/C. Because of this, after time t2 when the sailing entering conditions are satisfied, as shown by a characteristic of Npri (the broken line) of the comparative example in FIG. 5, the primary rotation speed Npri is reduced by and according to reduction of the engine rotation speed Ne. Therefore, when the accelerator ON operation is done by the change-of-mind at time t5, the primary rotation speed Npri of the variator 20 has already been a low rotation speed. Thus, although the restart of the engine by the starter motor 15 is possible, even if the engine rotation speed Ne is attempted to be increased, as shown by a characteristic of Ne (the broken line) of the comparative example in FIG. 5, an increase gradient of the engine rotation speed Ne becomes gentle. Therefore, a rotation synchronization timing at which the secondary rotation speed Nsec and the vehicle speed VSP, which are the input and output rotation speeds of the forward clutch Fwd/C, get closer to each other and the forward clutch Fwd/C is reengaged is time t8. Further, a rotation synchronization timing at which the engine rotation speed Ne and the primary rotation speed Npri get closer to each other and the lock-up clutch 9 is reengaged is time t9.

In contrast to this, in the case of the embodiment 1, when the sailing entering conditions are satisfied at time t2, the release of the lock-up clutch 9 is started. And, at time t3 when the release of the lock-up clutch 9 is completed, the fuel cut is started. Then, when the engine rotation speed Ne is the specified rotation speed or less at time t4, the release of the forward clutch Fwd/C is started. That is, at time t2 to t4 of the embodiment 1, the variator 20 is connected to the engine 1 at an upstream side through the torque converter 2, and is drive-connected to the driving wheel 7 at a downstream side by the forward clutch Fwd/C that is in an engaged state. During a time period t2 to t4, by the release of the lock-up clutch 9, a generation of a rotation speed difference between a decreasing engine rotation speed Ne and the primary rotation speed Npri is allowed, and by the engagement of the forward clutch Fwd/C, a rotation driving force from the driving wheel 7 is inputted to the variator 20 through the forward clutch Fwd/C. That is, by the fact that the variator 20 is rotated by the driving wheel 7, as shown by a characteristic Npri (a solid line) at time t2 to t4 of the embodiment 1 in FIG. 5, the primary rotation speed Npri after time t2 is substantially maintained with only a slight reduction occurring due to a deceleration travel. Therefore, when the accelerator ON operation is done by the change-of-mind at time t5, the primary rotation speed Npri of the variator 20 is maintained at a high rotation speed. Thus, since the primary rotation speed Npri is high, a load imposed on or applied to the engine 1 when increasing the engine rotation speed becomes small, and as shown by a characteristic Ne (solid line) of the embodiment 1 in FIG. 5, an increase gradient of the engine rotation speed Ne becomes steep. Therefore, a rotation synchronization timing at which the secondary rotation speed Nsec and the vehicle speed VSP, which are the input and output rotation speeds of the forward clutch Fwd/C, get closer to each other and the forward clutch Fwd/C is reengaged is time t6. Further, a rotation synchronization timing at which the engine rotation speed Ne and the primary rotation speed Npri get closer to each other and the lock-up clutch 9 is reengaged is time t8.

As explained above, in the case of the embodiment 1, a time required to engage the forward clutch Fwd/C after the accelerator ON operation is done by the change-of-mind is a required time T1 from time t5 to time t6. On the other hand, in the case of the comparative example, a time required to engage the forward clutch Fwd/C after the accelerator ON operation is done by the change-of-mind is a required time T2 from time t5 to time t8. That is, a required time is shortened by ΔT (ΔT=T2−T1).

[Feature of Sailing Stop Control Method]

In the embodiment 1, the control is configured to, when the sailing entering condition is satisfied, start the coast-travel with the rotation stop timing of the variator 20 being delayed with respect to the rotation stop timing of the engine 1. Then, when the accelerator pedal depression operation intervenes after the start of the coast-travel, the engine 1 is restarted, and the synchronization control of input and output rotation speeds of the forward clutch Fwd/C is performed. Further, when the synchronization is judged, the forward clutch Fwd/C is reengaged. That is, at the change-of-mind at which the accelerator pedal re-depression operation intervenes during the progress of the automatic stop of the engine 1, on the basis of satisfaction of the sailing quitting condition, the engine 1 is restarted, and the forward clutch Fwd/C is reengaged. Since the transmission rotation speed is higher than the engine rotation speed Ne at this change-of-mind, the load imposed on or applied to the engine 1 when increasing the engine rotation speed becomes small, then an increase speed of the engine rotation speed increases (the increase speed of the engine rotation speed becomes fast). Therefore, the input and output rotation speeds of the forward clutch Fwd/C become a synchronization judgment rotation speed early at the reengagement of the forward clutch Fwd/C, then the reengagement of the forward clutch Fwd/ is completed. As a consequence, the shift response from the coast-travel to the normal travel is improved at the change-of-mind at which the accelerator pedal re-depression operation intervenes during the progress of the automatic stop of the engine 1. That is, the same response as a response at the accelerator pedal re-depression operation from a complete stop of the engine 1 like a complete engine stop after a long time coast-travel by the sailing stop control is secured, thereby removing the driver's odd feeling (or the driver's awkward feeling).

In the embodiment 1, the torque converter 2 equipped with the lock-up clutch 9 is provided between the engine 1 and the variator 20. Then, when the sailing entering condition is satisfied, the lock-up clutch 9 is released (or disengaged), and after that, the fuel injection to the engine 1 is stopped. That is, by releasing the lock-up clutch 9 then creating a state that allows the generation of the rotation difference between the engine 1 and the variator 20, a state in which the rotation stop timing of the variator 20 is delayed with respect to the rotation stop timing of the engine 1 can be surely created. Hence, a state in which the transmission rotation speed is higher than the engine rotation speed Ne can be surely created at the change-of-mind. Here, in a case where the release control of the forward clutch Fwd/C under the predetermined condition is not performed, the forward clutch Fwd/C is automatically or spontaneously shifted to a clutch released state due to the fact that a discharge hydraulic pressure from the mechanical oil pump 10 is reduced by and according to reduction in the rotation speed of the engine 1.

In the embodiment 1, when the sailing entering condition is satisfied, the lock-up clutch 9 is released (or disengaged), and after that, the fuel injection to the engine 1 is stopped. And, when the engine rotation speed Ne is the specified rotation speed or less, the forward clutch Fwd/C is released, then the coast-travel is started. That is, by keeping the engagement of the forward clutch Fwd/C until a region where the engine rotation speed Ne exceeds the specified rotation speed, the primary rotation speed Npri of the variator 20 is maintained at a high rotation speed, then the increase gradient of the engine rotation speed Ne after the engine restart can be large. Here, when waiting for the forward clutch Fwd/C to automatically or spontaneously shift to the clutch released state, there might be variations in response performance of start of the restart of the engine 1 by the starter motor 15. However, by releasing the forward clutch Fwd/C when the engine rotation speed Ne is the specified rotation speed or less, the variations can be suppressed. Therefore, the response performance until the engagement of the forward clutch Fwd/C can be more stable at the change-of-mind, and improvement in the shift response from the coast-travel to the normal travel can be achieved.

Next, effects will be explained.

The sailing stop control method and the sailing stop control device for the engine vehicle according to the embodiment 1 obtain the following effects.

(1) The vehicle having a transmission (a variator 20) and a frictional engagement element (a forward clutch Fwd/C) that are disposed in series between an engine 1 and a driving wheel 7 and a starter motor 15 that starts the engine 1. And, the vehicle (an engine vehicle) coast-travels by a sailing stop control that, on the basis of satisfaction of a sailing entering condition, interrupts power transmission by the frictional engagement element (the forward clutch Fwd/C), stops the engine 1 and performs coast-travel of the vehicle. The sailing stop control is configured to, when the sailing entering condition is satisfied, start the coast-travel with a rotation stop timing of the transmission (the variator 20) being delayed with respect to a rotation stop timing of the engine 1. Further, the sailing stop control is configured to, when a sailing quitting condition is satisfied after the coast-travel is started, restart the engine 1 by the starter motor 15. Further, the sailing stop control is configured to, when it is judged that input and output rotation speeds of the frictional engagement element (the forward clutch Fwd/C) become a synchronization rotation speed after the engine 1 is restarted, reengage the frictional engagement element (the forward clutch Fwd/C).

Therefore, a sailing stop control method of the vehicle (the engine vehicle) which can improve the shift response from the coast-travel to the normal travel can be improved at the change-of-mind at which the sailing quitting condition is satisfied during the progress of the automatic stop of the engine 1 can be provided.

(2) The vehicle further has a torque converter 2 having a lock-up clutch 9 between the engine 1 and the transmission (the variator 20), and when the sailing entering condition is satisfied, the lock-up clutch 9 is released, and subsequently fuel injection of the engine 1 is stopped (step S1→step S2→step S3→step S4 in FIG. 4).

Therefore, in addition of an effect of (1), response performance can be surely improved at the change-of-mind.

(3) When the sailing entering condition is satisfied, the lock-up clutch 9 is released, and subsequently the fuel injection of the engine 1 is stopped. And, when an engine rotation speed Ne is a specified rotation speed or less, the frictional engagement element (the forward clutch Fwd/C) is released, and the coast-travel is started (step S3→step S4→step S5→step S6→step S7 in FIG. 4).

Therefore, in addition of an effect of (2), the response performance until the engagement of the frictional engagement element (the forward clutch Fwd/C) can be more stable at the change-of-mind, and improvement in the shift response from the coast-travel to the normal travel can be achieved.

(4) A sailing stop control device of a vehicle (an engine vehicle) comprises: a transmission (a variator 20) and a frictional engagement element (a forward clutch Fwd/C) that are disposed in series between an engine 1 and a driving wheel 7; a starter motor 15 that starts the engine 1; and a sailing stop controller (an integrated controller 13) that, on the basis of satisfaction of a sailing entering condition, interrupts power transmission by the frictional engagement element (the forward clutch Fwd/C), stops the engine 1 and performs coast-travel of the vehicle. And, the sailing stop controller (the integrated controller 13) is configured to, when the sailing entering condition is satisfied, start coast-travel with a rotation stop timing of the transmission (the variator 20) being delayed with respect to a rotation stop timing of the engine 1. Further, the sailing stop controller (the integrated controller 13) is configured to, when a sailing quitting condition is satisfied after the coast-travel is started, restart the engine 1 by the starter motor 15. Further, the sailing stop controller (the integrated controller 13) is configured to, when it is judged that input and output rotation speeds of the frictional engagement element (the forward clutch Fwd/C) become a synchronization rotation speed after the engine 1 is restarted, reengage the frictional engagement element (the forward clutch Fwd/C).

Therefore, a sailing stop control device of the vehicle (the engine vehicle) which can improve the shift response from the coast-travel to the normal travel can be improved at the change-of-mind at which the sailing quitting condition is satisfied during the progress of the automatic stop of the engine 1 can be provided.

Although the sailing stop control method and the sailing stop control device for the vehicle according to the present invention have been explained on the basis of the embodiment 1, a specified configuration is not limited to the embodiment 1. The configuration includes all design modifications and equivalents belonging to the technical scope of the present invention.

The embodiment 1 shows an example in which the forward clutch Fwd/C located at a downstream side of the variator 20 as the transmission is used as the frictional engagement element. However, as the frictional engagement element, a forward clutch located at an upstream side of the variator as the transmission could be used. Further, a transmission element located inside the transmission could be used as the frictional engagement element.

The embodiment 1 shows an example in which the sailing stop control method and the sailing stop control device for the vehicle according to the present invention are applied to the engine vehicle mounting therein the continuously variable transmission having the auxiliary transmission. However, the sailing stop control method and the sailing stop control device for the vehicle according to the present invention can be applied to an engine vehicle mounting therein a continuously variable transmission and an engine vehicle mounting therein a multi-range transmission. In short, as long as a vehicle has an engine having a starter motor, a driving wheel and a transmission and performs the sailing stop control, the sailing stop control method and the sailing stop control device for the vehicle according to the present invention can be applied to that vehicle.

The invention claimed is:

1. A method of sailing stop control of a vehicle, the vehicle having a transmission and a frictional engagement element that are disposed in series between an engine and a driving wheel, a starter motor that starts the engine and a torque converter having a lock-up clutch between the engine and the transmission, and the vehicle coast-travelling by the sailing stop control that, on the basis of satisfaction of a sailing entering condition, interrupts power transmission by the frictional engagement element, stops the engine and performs coast-travel of the vehicle, the method comprising:

when the sailing entering condition including a brake OFF condition is satisfied, starting release of the lock-up clutch, stopping fuel injection of the engine after completion of the release of the lock-up clutch and releasing the frictional engagement element after stop of the fuel injection of the engine;

when a sailing quitting condition is satisfied after the coast-travel is started, restarting the engine by the starter motor; and when it is judged that input and output rotation speeds of the frictional engagement element become a synchronization rotation speed after the engine is restarted, reengaging the frictional engagement element.

2. A sailing stop control device of a vehicle comprising:

a transmission and a frictional engagement element that are disposed in series between an engine and a driving wheel;

a starter motor that starts the engine;

a torque converter having a lock-up clutch between the engine and the transmission; and a sailing stop controller that, on the basis of satisfaction of a sailing entering condition, interrupts power transmission by the frictional engagement element, stops the engine and performs coast-travel of the vehicle, and the sailing stop controller being configured to, when the sailing entering condition including a brake OFF condition is satisfied, start release of the lock-up clutch, stop fuel injection of the engine after completion of the release of the lock-up clutch and release the frictional engagement element after stop of the fuel injection of the engine, when a sailing quitting condition is satisfied after the coast-travel is started, restart the engine by the starter motor, and when it is judged that input and output rotation speeds of the frictional engagement element become a synchronization rotation speed after the engine is restarted, reengage the frictional engagement element.

* * * * *